UNITED STATES PATENT OFFICE.

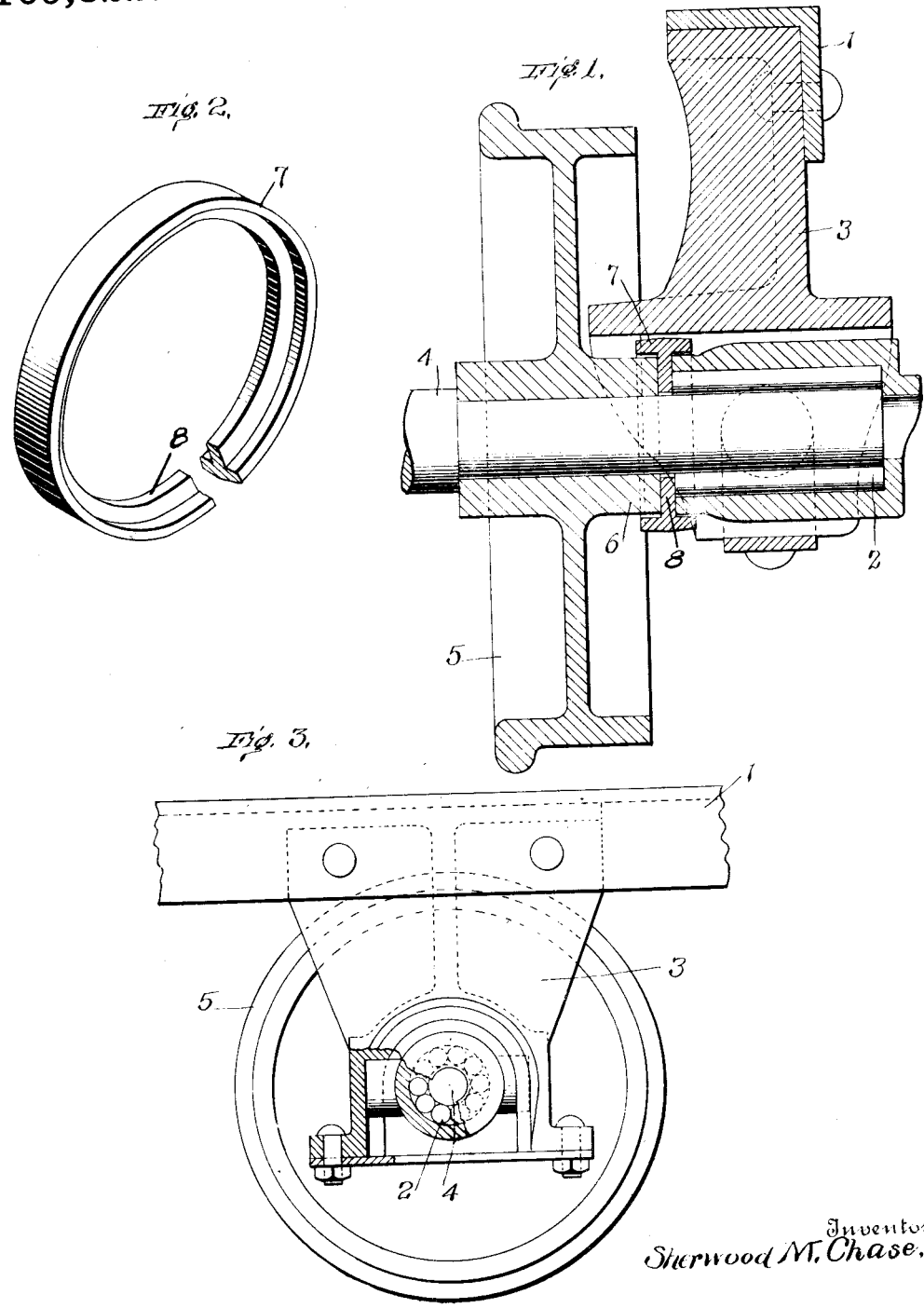
S. M. CHASE.
GUARD FOR BEARINGS.
APPLICATION FILED MAY 14, 1913.
1,109,822.
Patented Sept. 8, 1914.

SHERWOOD M. CHASE, OF COLUMBUS, OHIO, ASSIGNOR TO THE CHASE FOUNDRY AND MANUFACTURING COMPANY, OF COLUMBUS, OHIO, A CORPORATION OF OHIO.

GUARD FOR BEARINGS.

1,109,822.  Specification of Letters Patent.  Patented Sept. 8, 1914.

Application filed May 14, 1913. Serial No. 767,620.

*To all whom it may concern:*

Be it known that I, SHERWOOD M. CHASE, a citizen of the United States, residing at Columbus, in the county of Franklin and State of Ohio, have invented certain new and useful Improvements in Guards for Bearings, of which the following is a specification, reference being had therein to the accompanying drawing.

This invention relates to dust guards for bearings and the object of the invention is to provide a guard which will exclude the dust from the bearings more efficiently than the dust guards now in use.

To this end it is a further object of the invention to provide a floating guard which will extend between and overlap the adjacent portions of the hub and the bearing and will thus accommodate itself to the same and will effectually exclude the dust therefrom.

In the accompanying drawings, Figure 1 is a longitudinal sectional view taken through a hub and bearing showing my invention applied thereto; Fig. 2 is a detail perspective view of the dust guard; and Fig. 3 is an elevation, partially broken away, of the bearing to which the dust guard is applied.

In these drawings I have illustrated one embodiment of my invention and have shown the same as applied to a truck, indicated as a whole by the reference numeral 1, and of that type commonly employed in industrial cars. The bearing 2 is of the roller bearing type and is pivotally mounted in a bracket 3 carried by the frame of the truck. This pivotal mounting enables the bearing to automatically aline itself with the axle 4 on which track wheels 5 are mounted. The hub 6 of each wheel is spaced a short distance from the adjacent bearing and in order to effectually exclude the dust from the bearing I have provided a floating dust guard or shield having parts overlapping the respective ends of the bearing and hub and having another part extending between the bearing and the hub to properly position the shield with relation thereto. In the form of device here shown this shield comprises a ring 7 of a diameter slightly greater than the diameter of the ends of the bearing and the hub and of a width sufficient to enable it to overlap the ends of these members for a sufficient distance to prevent dust passing between the shield and said ends. This shield has on its inner surface an inwardly projecting part, or parts, forming a stop which, in the present instance, comprises a flange 8 adapted to extend between the hub and the bearing, thereby maintaining the shield in proper relation with the ends of these parts. In this manner the shield is free to float and may be supported in close relation to and in actual contact with the hub and bearing but owing to its floating character and its ability to move with these parts it offers no resistance to their movement. Because of its relation to the hub and bearing it very effectually excludes dust or dirt falling from the truck.

The term "floating" as used herein in connection with the guard ring is intended to define that ring as having free movement relatively to the parts with which it coöperates. It is not necessarily supported out of contact with these parts, but the contact, when it exists, is not such as to interfere with the free movement of the ring.

While I have shown and described one embodiment of my invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. The combination, with a bearing, and a part journaled in said bearing, of a floating dust shield comprising a flat annular body portion extending loosely about the end of said bearing and having an inwardly extending radial stop spaced away from both edges thereof to maintain said shield in proper relation to said bearing, said shield being free to move relatively to both said bearing and the part journaled therein.

2. The combination, with a bearing, a part journaled in said bearing, and a hub carried by said part adjacent to said bearing, of an annular shield extending loosely about the part journaled in said bearing and having axially extending portions overlapping the adjacent ends of said bearing and said hub and having a portion extending inwardly between said hub and bearing to position the shield relatively thereto, said shield being loosely supported and free to move relatively to any or all of said parts.

In testimony whereof I affix my signature in presence of two witnesses.

SHERWOOD M. CHASE.

Witnesses:
S. W. LATHAM,
ALICE H. LATHAM.